March 28, 1933.  V. KENEY  1,902,816
COMBINED EYE AND EYELASH FOR DOLLS
Original Filed April 11, 1931
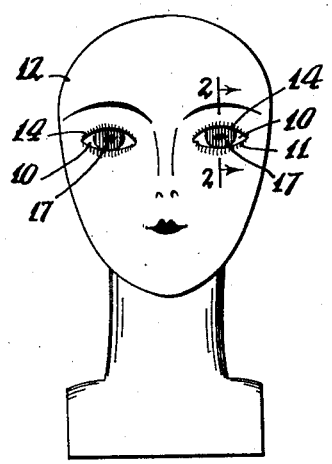
Fig. 1
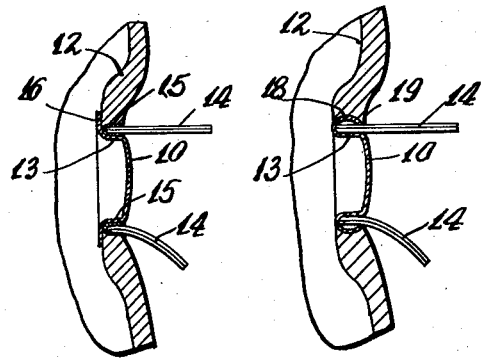
Fig. 2    Fig. 3
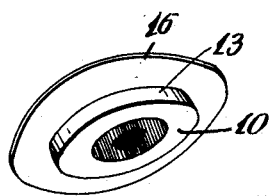
Fig. 6
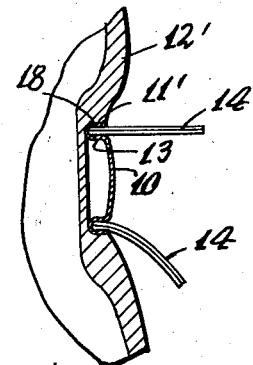
Fig. 4
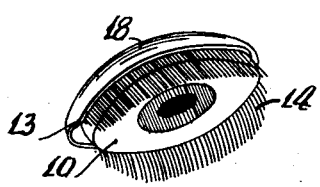
Fig. 7
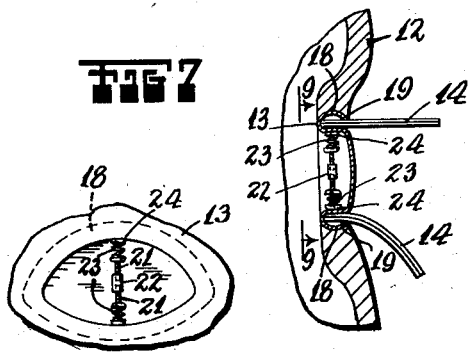
Fig. 8
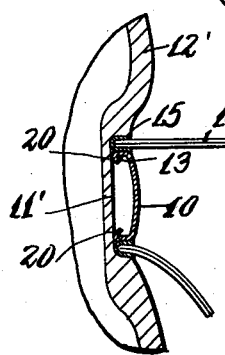
Fig. 5
Fig. 9
INVENTOR
Victor Keney
BY
ATTORNEY Patented Mar. 28, 1933

1,902,816

UNITED STATES PATENT OFFICE

VICTOR KENEY, OF WOODSIDE, NEW YORK

COMBINED EYE AND EYELASH FOR DOLLS

Application filed April 11, 1931, Serial No. 529,469. Renewed July 25, 1932.

This invention relates to new and useful improvements in a combined eye and eyelash for dolls.

The invention has for an object the provision of a combined eye and eyelash for dolls which is characterized by a sheet metal member for extending transversely across an eye opening of a doll and having inwardly directed edges, and eyelashes supported outside of said edges, whereby resiliency of the inwardly directed edges hold the eye and eyelash in place in the eye opening of a doll.

It is a still further object of this invention to provide a separate metal frame supporting eyelashes and disposed outside of the inwardly directed edges so that the latter edges serve to hold the frame in place.

Another one of the objects of this invention is the provision of a flange on the inwardly directed edge, whereby the eye member may be placed inside of the doll's head and the flange prevent outward displacement.

A still further object of this invention is the provision that the inwardly directed edges be bent upon themselves and clamped on the lashes in place.

Another object of this invention is to recess the doll's head for receiving the combined eye and eyelash.

It is still further proposed to provide a means for changing the resiliency of the inwardly directed edges so as to properly hold the eye member within the doll's head.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a front elevational view of a doll's head with eye members according to this invention.

Fig. 2 is a fragmentary enlarged sectional view taken on the line 2—2 of Fig. 1.

Fig. 3 is a view similar to Fig. 2, but illustrating a modified arrangement.

Fig. 4 is another view similar to Fig. 2, but illustrating a still further modified arrangement.

Fig. 5 is still another view similar to Fig. 2, but illustrating a still further modified arrangement.

Fig. 6 is a perspective detailed view of the sheet metal member used in Fig. 2.

Fig. 7 is a perspective view of the sheet metal member used in Fig. 3.

Fig. 8 is a view similar to Fig. 3, but illustrating a still further modification.

Fig. 9 is an elevational view looking in the direction of the line 9—9 of Fig. 8.

The combined eye and eyelash for dolls according to this invention consists of a sheet metal member 10 for extending transversely across an eye opening 11 in a doll 12 and having inwardly directed edges 13, and eyelashes 14 supported outside of the edges 13, whereby the resiliency of the inward directed edges 13 hold the eye member 10 and the lashes 14 in place in the eye opening of the doll. The lashes 14 in Fig. 2 are shown supported in a metallic frame 15 which encircles the edges 13. This metallic frame is of substantially U form in transverse cross section to engage over the inner ends of the lashes 14. A rear flange 16 is integral with the inwardly directed edges 13 and acts against the inside of the doll's head to prevent the eye member 10 from being displaced outwardly. The resiliency of the edges 13 is depended upon to firmly hold the eye member 10 from being disposed inwardly. An eye ball 17 and other necessary parts of the eye are painted upon the outside of the eye member 10.

In the modified form of the invention illustrated in Fig. 3, a sheet metal eye member 10 has been illustrated extended transversely across the eye opening of the doll and provided with inwardly directed edges 13 which are bent outwards upon themselves, whereby top layers 18 extend over and serve to hold the lashes 14 in place. The edges 19 of the backturned portions 18 dig into the lashes 14 to insure better holding of the latter elements. Furthermore, the eye openings are formed of curved shape in transverse section so that the backturned portions 18 snugly fit therein as sockets and maintain their positions under stress, which supplements the holding of the lashes in place. The resiliency of the inturned edges 13 which tend to separate insure the proper holding of the combined eye and lashes upon the doll's head.

In the modified arrangement illustrated in Fig. 4, a doll's head 12' has been shown which is provided with eye openings 11' which do not extend completely through but are merely in the form of recesses. An eye member 10 is shown with inward directed edges 13 which have outward bent portions 18 holding eye lashes 14. This combined eye member and lashes is disposed within the recess 11' and the resiliency of the inwardly directed edges 13 is depended upon to hold the combined eye and lash in place.

In Fig. 5 another arrangement of the invention has been disclosed, in which the doll 12' is provided with a recess 11' for receiving the combined eye and lash member. This recess only extends partially into the surface of the doll and not through to the interior. It resembles closely the arrangement shown in Fig. 4. The only distinction with Fig. 4 is that the combined eye and lash member is formed from two separate sections. One of the sections constitutes a transverse sheet metal member 10 on which the eye is painted or otherwise inscribed and which extends transversely across the eye opening. Inward directed edges 13 from the transverse member 10 engage into the recess 11' and act against a frame 15 which supports the eye lashes 14. The frame 15 is of substantially U shape and the lashes 14 are clamped at their inner ends between arms of the U. Furthermore, to reinforce the parts, the inner edges of the inturned edges 13 are turned at substantially right angles to the main part. These right angle portions are indicated by reference numeral 20.

In Fig. 6 a detail of the sheet metal member illustrated in Fig. 2 is shown. It should be noticed that the eye member 10 is of almond shape so as to correspond with an eye and connects with the inwardly directed edges 13 which finally terminate in the flange 16. In Fig. 7 a detail of the metallic member and the lashes shown in Fig. 3 has been disclosed. It should be noticed that the eye member 10 has an inwardly directed edge 13 which terminates in an outwardly directed portion 18 serving to clamp the lashes 14 in place.

In Figs. 8 and 9 another arrangement of the invention has been disclosed, in which a means is provided for changing the pressure exerted by the resilient inwardly directed edges so that adjustments can be made for the proper supporting of the combined eye and eyelash in place. The means referred to comprises a pair of stud screws 21 having respectively right and left handed threads engaged by a uniting coupling tube 22. The outer ends of the studs 21 are rigidly connected with springs 23 which act against opposite sides of the inwardly directed edges 13. Conical projections 24 from the inwardly directed edges act against the springs 23 and serve to hold the springs against accidental displacement. The coupler 22 may be turned for forcing the stud rods 21 together or further apart to control the pressure exerted by the resilient inwardly directed edges 13.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A combined eye and lash member for dolls, comprising a sheet metal member for extending transversely across an eye opening of a doll and having resilient inwardly directed edges, and eyelashes supported outside of said edges, said resilient inwardly directed edges holding the eye and eyelash in place in the eye opening of a doll.

2. A combined eye and lash member for dolls, comprising a sheet metal member for simulating an eye and extending transversely across an eye opening of a doll and having resilient inwardly directed edges, and eyelashes supported outside of said edges, said resilient inwardly directed edges holding the eye and eyelash in place in the eye opening of a doll, a flange being integral with the inwardly directed edges for acting against the inner face of the doll's head serving to hold the eye member against outward displacement.

3. A combined eye and lash member for dolls, comprising a sheet metal member for extending transversely across an eye opening of a doll and having resilient inwardly directed edges, and eyelashes supported outside of said edges, said resilient inwardly directed edges holding the said metal member and eyelash in place in the eye opening of a doll, a frame located outside of said edges serving to support said eyelashes as specified.

4. A combined eye and lash member for dolls, comprising a sheet metal member for extending transversely across an eye opening of a doll and having resilient inwardly directed edges, and eyelashes supported outside of said edges, said resilient inwardly directed edges holding the said metal member and eyelash in place in the eye opening of a doll, a frame located outside of said edges serving to support said eyelashes as specified, said frame being of substantially U shape in transverse cross section and the inner ends of the eyelashes being clamped between the arms of the U formation.

5. A combined eye and lash member for dolls, comprising a sheet metal member for extending transversely across an eye opening of a doll and having resilient inwardly directed edges, and eyelashes supported outside of said edges, said resilient inwardly directed edges holding the said metal member and eyelash in place in the eye opening of a doll, a portion of the inwardly directed edges being bent outwardly upon themselves and serving to clamp the eyelashes.

6. In combination with a doll's head having an eye opening with a curved contacting surface, a sheet metal member for extending transversely across the eye opening and having inwardly directed edges with portions turned outwardly upon themselves to clamp eyelashes therebetween, said inwardly directed edges engaging within the curved surfaces of the eye opening for maintaining the position of the metallic member, and eyelashes supported between the inwardly directed edges and the outwardly turned portions.

7. In combination with a doll's head having an eye opening with a curved contacting surface, a sheet metal member for extending transversely across the eye opening and having inwardly directed edges with portions turned outwardly upon themselves to clamp eye lashes therebetween, said inwardly directed edges engaging within the curved surfaces of the eye opening for maintaining the position of the metallic member, and eyelashes supported between the inwardly directed edges and the outwardly turned portions, the eye opening in the doll's head being in the form of a recess which does not extend completely through the inside of the head.

8. In combination with a doll's head having a recess constituting an eye opening, a sheet metal member extended transversely across the opening and having inwardly directed edges, a frame clamped between the inwardly directed edges and the edges of the eye opening, and eyelashes mounted in said frame.

9. A combined eye and lash member for dolls, comprising a sheet metal member for extending transversely across an eye opening of a doll and having resilient inwardly directed edges, eyelashes supported outside of said edges, said resilient inwardly directed edges holding the said metal member and eyelash in place in an eye opening of a doll, and means for changing the pressure exerted by the resilient inwardly directed edges.

10. A combined eye and lash member for dolls, comprising a sheet metal member for extending transversely across an eye opening of a doll and having resilient inwardly directed edges, eyelashes supported outside of said edges, said resilient inwardly directed edges holding the said metal member and eyelash in place in an eye opening of a doll, and means for changing the pressure exerted by the resilient inwardly directed edges, comprising a pair of threaded studs having oppositely directed threads threadedly engaging a coupler, and springs acting between the outer ends of said studs and the inner faces of said inwardly directed edges.

In testimony whereof I have affixed my signature.

VICTOR KENEY.